United States Patent [19]

Koyama et al.

[11] 4,093,262
[45] June 6, 1978

[54] FRONT FORK FOR TWO-WHEELED VEHICLES

[75] Inventors: Mikihiro Koyama, Kawagoe; Kazuo Watanabe, Asaka, both of Japan

[73] Assignee: Honda Giken Kogyo Kabushiki Kaisha, Tokyo, Japan

[21] Appl. No.: 734,273

[22] Filed: Oct. 20, 1976

[30] Foreign Application Priority Data

Oct. 24, 1975 Japan .................................. 50-145154

[51] Int. Cl.² .............................................. B62K 19/32
[52] U.S. Cl. ..................................................... 280/279
[58] Field of Search ............... 280/270, 271, 272, 275, 280/276, 279, 280, 283; 116/28 R

[56] References Cited

U.S. PATENT DOCUMENTS

| 591,930 | 10/1897 | Plummer | 280/271 |
| 1,429,107 | 9/1922 | Sage | 280/276 |
| 2,511,320 | 6/1950 | Benson | 280/272 |

FOREIGN PATENT DOCUMENTS

| 606,077 | 11/1925 | France | 280/280 |
| 2,321,818 | 11/1974 | Germany | 280/289 R |
| 13,683 of | 1909 | United Kingdom | 280/280 |

*Primary Examiner*—Joseph F. Peters, Jr.
*Assistant Examiner*—R. Schrecengost
*Attorney, Agent, or Firm*—Haseltine, Lake & Waters

[57] ABSTRACT

A front fork for a two-wheeled vehicle such as, for example, a motor-cycle and so on, which is constructed with a pair of fork members, each comprising an upper and lower fork bodies which can relatively and mutually extend and retract by slide-movement, a spring member to serve as a buffer against external shock; a bridge member made of a hollow square cylindrical body, at the center part of which the bottom end of a steering stem is fixed, and at both end parts of the lower wall of which there are perforated openings for fitting thereinto each upper end part of the pair of fork members by welding the same to the upper and lower wall of the bridge member; an engagement piece to support the steering stem in a rotatable manner; and a handle stopper fixedly secured to the center part of the bridge member along with the lower end part of the steering stem to restrict the relative rotational range of a steering handle.

4 Claims, 3 Drawing Figures

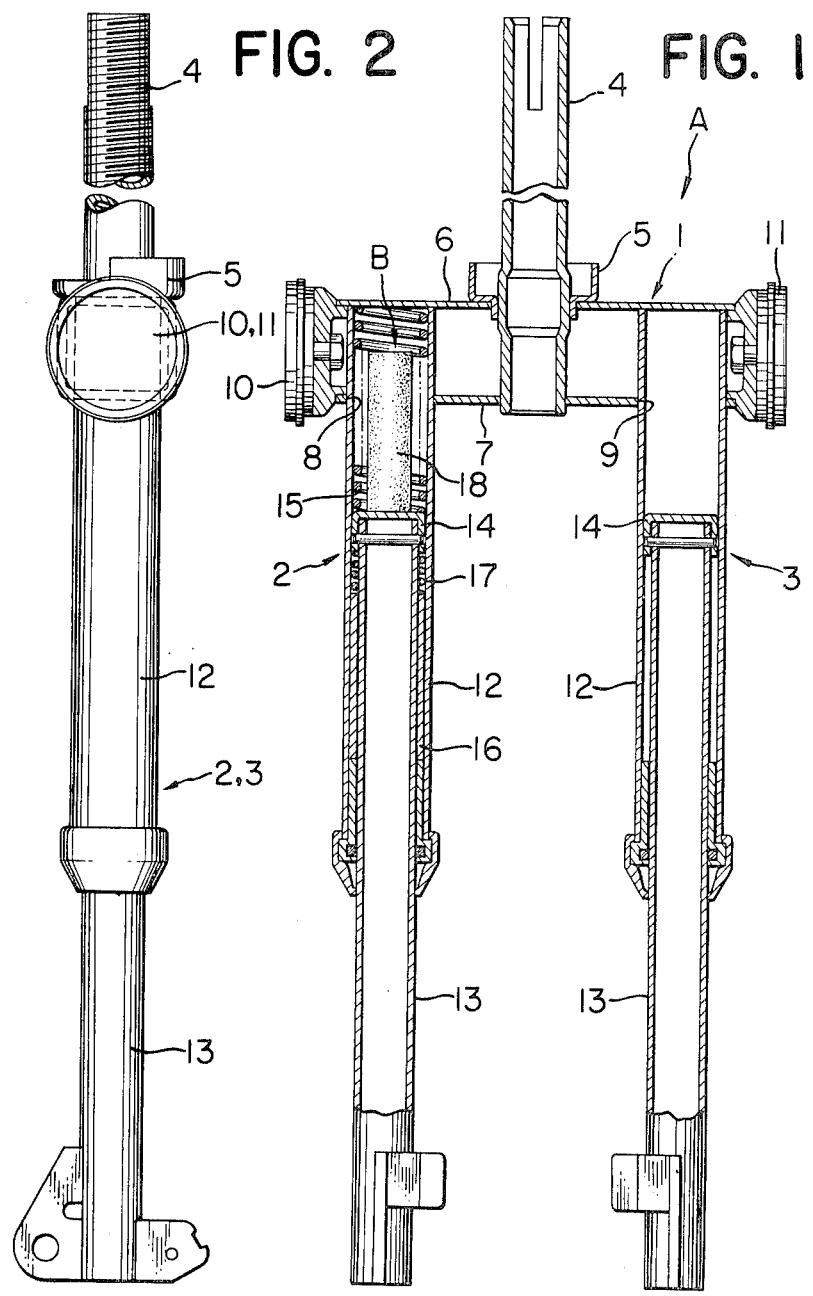

FRONT FORK FOR TWO-WHEELED VEHICLES

BACKGROUND OF THE INVENTION

The present invention is concerned with a front fork for a two-wheeled vehicle such as, for example, a motor-cycle, and so forth.

In general, the front fork for the two-wheeled vehicle like the motor-cycle is required to have such a high ridigity, while maintaining the proper function of the front fork per se, that may not cause its deformation when it is subjected to external force. In particular, the bridge member to join a steering stem with left and right fork members receives concentrated twisting force, etc., on account of which it is desirable that rigidity of every member be increased, and also that the front fork be constructed in as lighter a weight as possible with a view to improving the steering performance of the motor-cycle as well as to reduce the weight of the vehicle as a whole.

SUMMARY OF THE INVENTION

It is therefore the essential object of the present invention to provide the front fork for the motor-cycle, the construction of which is very simple but remarkably rigid against any shock from outside, and which can readily attain the purpose of the present invention.

According to the present invention, generally speaking, there is provided a front fork for a two-wheeled vehicle such as a motor-cycle comprising a bridge member, at the center part of which the bottom end of a steering stem is fixedly secured, and a pair of left and right fork members to be fixedly secured at both ends of the bridge member, in which the bridge member is constructed with a hollow square cylindrical body, the top end parts of the pair of fork members are respectively inserted and fitted into fitting openings perforated at both left and right end parts of the bottom wall surface of the bridge member, and the top end parts of the pair of fork members are fixedly joined by welding to the upper wall and the lower wall of the bridge member respectively.

The foregoing object, other objects as well as detailed construction and functions of the present invention will become more apparent and understandable from the following description of a preferred embodiment of the invention, when read in conjunction with the accompanying drawing.

BRIEF EXPLANATIONS OF ACCOMPANYING DRAWING

In the drawing:

FIG. 1 is a front view in longitudinal cross-section showing a main part of the front fork according to the present invention;

FIG. 2 is a side elevational view thereof; and

DETAILED DESCRIPTION OF PREFERRED EMBODIMENT

Figure 3:
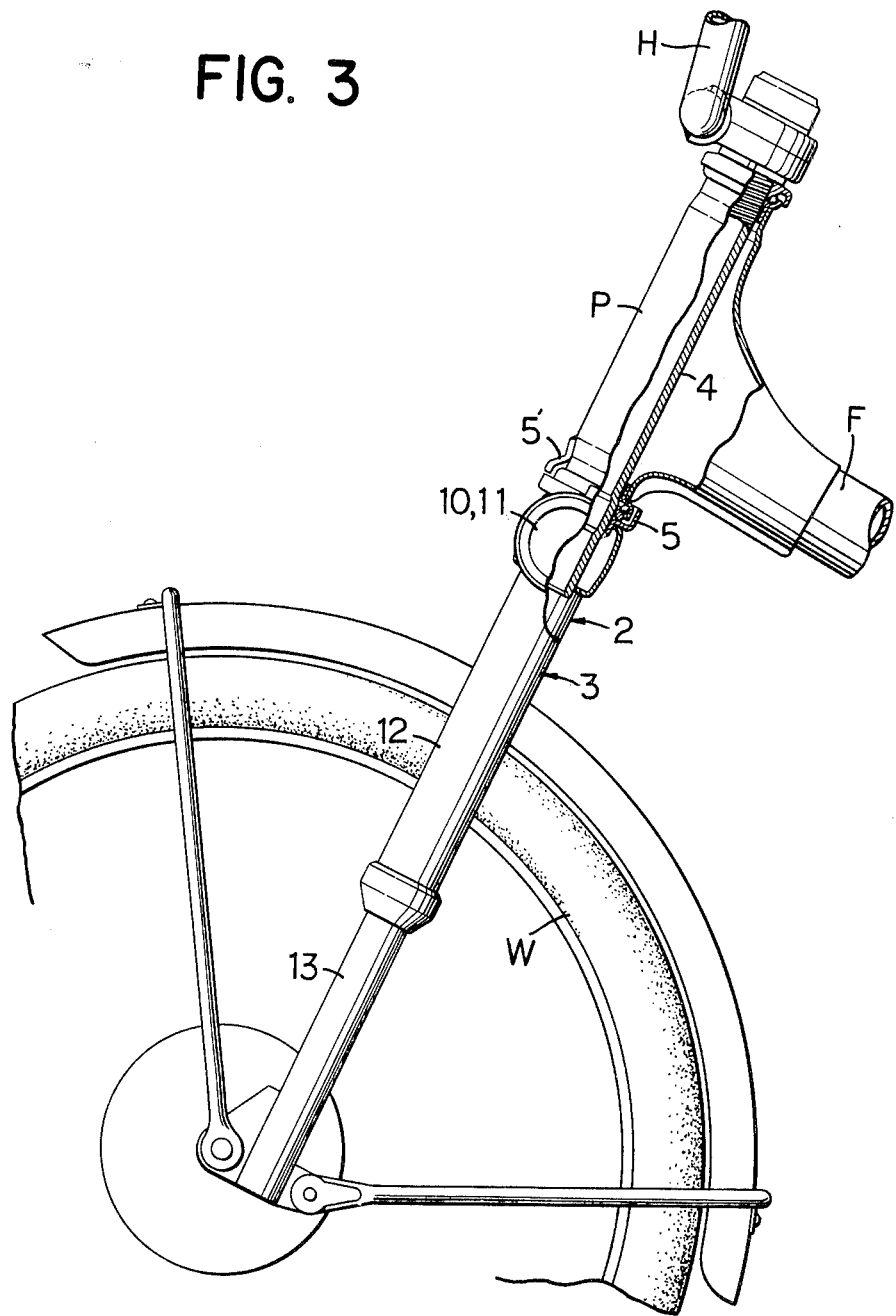
FIG. 3 is a side elevational view, partly cut away, of a front portion of a motor-cycle provided with the front fork according to the present invention.

Reference is now had to the accompanying drawing which illustrates a preferred embodiment of the front fork according to the present invention. The front fork A is constructed with a single bridge member 1 and a pair of left and right fork members 2, 3 to be fixedly secured, at one end of each of them, to the respective left and right sides of the bridge member 1. At the center part of the bridge member 1, there is fixedly joined by welding the lower end part of a steering stem 4, together with a handle stopper 5 to be described later, with a steering handle H being fixed at the upper end part of the steering stem 4. The steering stem 4 is supported by a head pipe P at the front part F of the body frame of the motor-cycle in a freely rotatable manner. The handle stopper 5 is formed in an annular shape, the top end of which is partly notched as shown in FIG. 2. An engagement piece 5' to be welded to the lower end part of the head pipe P is accommodated into this notched portion. The range of rotation of the steering handle 5 to the head pipe P is regulated by the engagement of this engagement piece 5' and the edge of the notched portion. At the bottom end of the fork members 2 and 3, there is supported a front wheel W by a conventional expedient.

In the following, the construction of the abovementioned bridge member 1 will be explained more specifically. This bridge member is constructed by a hollow square cylindrical body, the upper and lower walls 6, 7 of which are formed to have a flat surface. At both left and right end parts of the abovementioned lower wall 7, there are formed openings 8 and 9, into each of which the upper end part of each of the left and right fork members 2, 3 is to be inserted. Also, at both open sides of the bridge member 1, there are securely fixed left and right reflectors 10 and 11.

Explaining now the actual construction of the left and right front forks 2 and 3 in the following, each of the front fork members is constructed by inserting a lower fork body 13 into an upper fork body 12 in a freely slidable manner. On the top end of the lower fork body 13, there is connected by a pin a piston 14 to guide the lower fork body in its slide movement in the up-and-down directions.

The top end parts of the left and right fork members 2 and 3, i.e., the top end parts of the upper fork bodies 12, 12, are inserted into the fitting openings 8 and 9 perforated in the lower wall 7 of the bridge member 1, and the upper brims thereof are abutted to the inner surface of the upper wall 6 of the bridge member 1 so that the inner surface of the upper wall 6 and the upper brim of the upper fork body 12 may be integrally joined together by welding. On the other hand, the abovementioned lower wall 7 and the upper outer periphery of the upper fork body 12 are integrally joined by welding around the afore-mentioned fitting openings 8 and 9.

A buffer device B is interposingly provided between the upper and lower fork bodies 12, 13 in each of the left and right sides of the fork members 2 and 3, or between the upper and lower fork bodies 12 and 13 in any one of the left or the right side of the fork members 2 and 3, so that both left and right fork members 2 and 3 may be extended or retracted in the up-and-down directions to absorb shock from outside.

In the preferred embodiment of the front fork for the two-wheeled vehicle according to the present invention as shown in the drawing, the above-described buffer device B is equipped on the left fork member 2 alone with a view to reducing the weight of the front fork as a whole and to decreasing the number of assembly parts to be used therefor.

In the following, the construction of this buffer device B will be described in detail.

An upper buffer spring 15 is accommodated in the upper fork body 12 between the upper wall 6 of the bridge member 1 and the piston 14 fixed at the top end of the lower fork body 13. Also, a lower buffer spring 17 is accommodated between the lower surface of the piston 14 and the upper fork body 12 by way of a collar 16. The buffer springs 15 and 17 soften the up-and-down slide-movement of the lower fork body 13 relative to the upper fork body 12. Further, on the upper surface of the abovementioned piston 14, there is fixed a bumping rubber 18. This bumping rubber 18 is capable of controlling the upper limit position of the lower fork body in a shock-absorbing manner.

The front fork A which is constructed as mentioned in the foregoing supports the steering stem 4 to be fixed to the bridge member 1 in a head pipe P of the frame F of the motor-cycle body in a freely rotatable manner. The front wheel W is held at the lower end of, and between, the left and right fork members 2 and 3. External force acting on the lower fork body 13 from the front wheel W is absorbed and buffered by the abovementioned buffer device B, and transmitted to the upper fork body 12.

Thus, according to the present invention, the bridge member 1 is constructed with the hollow square cylindrical body having a relatively large rigidity, the top end parts of the pair of left and right fork members 2 and 3 are inserted and fitted into the fitting openings 8 and 9 perforated in both left and right ends of the lower wall 7 of the square cylindrical body, and the top end parts are joined by welding at two portions on the flat upper and lower walls 6, 7 of the bridge member 1. In so constructing the front fork, the welding area for the fork member becomes increased, and, at the same time, the welding operations can be done easily to realize a tough weldment, whereby rigidity of the front fork as a whole becomes remarkably increased in spite of the fact that the bridge member 1 is formed of the hollow cylindrical body.

Moreover, the bridge member 1 does not have any particular shape as in the known ones, but it can be manufactured with a hollow square cylindrical body, with the consequence that the manufacture of the member becomes facilitated, which contributes to a reduction in the manufacturing cost.

Further, since the bridge member 1 is hollow inside as already repeatedly mentioned in the foregoing, the weight of the left and right fork members 2 and 3 becomes reduced, on account of which the steering performance of the handle can be increased, and, at the same time, the weight of the motor-cycle body can be reduced.

In addition, since the upper buffer spring 15 is interposingly provided between the inner surface of the upper wall 6 of the bridge member 1 and the lower fork body 13, the flat upper wall 6 of the bridge member 1 can be made a seating surface, onto which the abovementioned upper buffer spring 15 can be directly received, hence there is no necessity at all for particular machining work to provide such receiving and seating surface for the spring, nor is there any necessity for fitting a separate spring receiving member.

Although the present invention has been described with particularity in the foregoing in reference to a preferred embodiment thereof, it should be understood that this particular embodiment is merely illustrative, and, is in no way restrictive to the concept of the present invention, but any change and modification may be made by those skilled in the art within the spirit and scope of the present invention as set forth in the appended claims.

What is claimed is:

1. An improved front fork for a two-wheeled vehicle such as a motor-cycle comprising: a bridge member (1) having a steering stem 4 fixedly secured at the center part thereof; and a pair of fork members (2, 3) fixedly secured to both ends of the bridge member 1, the improvement comprises: said bridge member (1) being constructed of a hollow square tubular body having the top end parts of said fork members (2, 3) respectively being insertable and fitted into openings (8), (9) perforated at both left and right end parts of bottom wall surface of said bridge member 1, said top end parts of said pair of fork members (2), (3) being fixedly joined to the upper wall 6 and the lower wall (7) of said bridge member (1), respectively and an engagement member (5') being fixedly secured to the lower end part of a head pipe P of a front part F of a vehicle body frame to support said steering stem (4) in a freely rotatable manner, a handle stopper (5) being fixedly secured to said bridge member (1) at a center portion thereof, along said lower end part of said steering stem (4), said handle stopper (5) engaging said engagement member (5') for restricting the relative rotational range of a steering handle H, said handle H being fixedly secured to the top end of said steering stem (4) with respect to said head pipe P.

2. An improved front fork for a two-wheeled vehicle as set forth in claim 1, wherein: each of said fork members (2), (3) being constructed with hollow upper and lower fork bodies (12) and (13), adapted to be relatively and mutually extended and retracted, and a spring member (15) providing a buffer for the extending and retracting movement of said upper and lower fork bodies (12) (13), said spring member (15) being disposed between the top end of said lower fork body (13) of at least one of said fork members (12), (13) and the inner surface of the upper wall 6 of said bridge member 1.

3. An improved front fork for a twowheeled vehicle as set forth in claim 2, wherein: the top end of said upper fork body (12) of at least one of said fork members (2), (3), retaining spring member (15) being opened whereby one end of said spring member (15) may be directly in contact with the inner surface of the upper wall (6) of said bridge member (1) for seating said spring.

4. An improved front fork for a two-wheeled vehicle as set forth in claim 1, wherein reflectors (10), (11) being disposed at both sides of said bridge member (1).

* * * * *